Patented Dec. 27, 1938

2,141,575

UNITED STATES PATENT OFFICE 2,141,575

COMPOSITION OF MATTER

Harold Warp, Chicago, Ill.

No Drawing. Application April 2, 1937,
Serial No. 134,684

5 Claims. (Cl. 134—15)

This invention relates to a composition of matter for coating sheet material such as paper, fabric, wire screen and the like to close up the pores or meshes thereof and to render the material imperforate and weatherproof.

More specifically, this invention relates to a rosin-wax composition capable of forming a flexible, semi-transparent, weatherproof film that transmits ultra-violet and infra-red light rays.

The invention is especially useful for preparing window glass substitutes by coating reticular material such as woven fabric or wire screens therewith to close up the meshes of the material with a flexible film. The reticular material is embedded in the film and the resulting sheet is flexible, imperforate, weatherproof and semi-transparent. The ability of the film to transmit ultra-violet and infra-red rays of the sun makes the sheet material coated with the composition highly desirable for use in hot-beds, chicken-coops, animal-pens, summer-porches and the like.

The composition of this invention is a mixture of plastic wax and rosin or a synthetic resin material. The plastic wax is preferably "micro-crystalline paraffin wax" having a melting point of from 140° to 165° F., at present being sold by National Wax Company of Chicago, Illinois. This "paraffin wax" is micro-crystalline and is obtained from petroleum without the addition of plasticizers. It has materially higher melting points than ordinary paraffin wax and is readily distinguished by its plasticity even at low temperatures, such as 32° F. The "micro-crystalline paraffin wax" is thus pliable at atmospheric temperatures even down to freezing temperatures and does not dry out or become brittle. The preferred rosin is natural water-white gum rosin having a melting point around 170° F. The two materials are melted together and thoroughly mixed in a molten stage. The molten mass is applied to the reticular sheet at temperatures around 250° F. or higher. The mass upon solidification on the sheet material fills up the pores or meshes of the sheet with a semi-transparent, highly flexible film to form a flexible ultra-violet and infra-red ray penetrable weatherproof sheet. If desired the molten mass can be tinted or colored by means of a dye such as an aniline dye. If transparency is not necessary, cheaper grades of wood or gum rosin can be used.

The fused mass is soluble in solvents such as benzene, naphtha or alcohol and if desired can be applied to the reticular material in solution form in one of these solvents. The solvent can then be evaporated to leave the film of pliable rosin-wax on the sheet material.

It is then an object of this invention to provide a rosin composition capable of forming tough, flexible, waterproof and translucent films.

Another object of this invention is to render brittle rosin material pliable.

A further object of this invention is to provide a rosin-wax composition for filling up the meshes of reticular sheets.

A further object of this invention is to provide a rosin-micro-crystalline-wax composition that admits ultra-violet and infra-red rays.

Other and further objects of this invention will become apparent to those skilled in the art from the following example illustrating a preferred embodiment of the invention.

*Example.*—2 parts of natural water-white gum rosin having a melting point of about 170° F. are melted together with 1 part of "micro-crystalline paraffin wax" having a melting point of about 160° F. The molten mixture is stirred to produce a homogeneous mass. The homogeneous mass is applied to reticular sheet material, such as for example, a wire screen, by dipping the sheet into a molten bath of the composition preferably maintained at temperatures of 250° F. or higher. The excess composition can be doctored or scraped off the dipped sheet. A layer of a desired thickness is thus obtained, preferably just sufficient to embed the wires in the layer. The coated screen is allowed to cool, either by passing through water, or otherwise, to effect solidification of the rosin-wax composition. The cooled product is a weatherproof, flexible, semi-transparent sheet having the wires of the screen embedded in the composition. The film of the composition fills up the meshes of the screen and adheres to the screen wires with great tenacity. The flexible sheet thus produced admits ultra-violet and infra-red rays and remains pliable at all temperatures below its melting point.

The composition of this invention is stable and will not objectionably shrink, expand, oxidize, crystallize or flake off when exposed to the elements.

It has heretofore been proposed to incorporate oils or plasticizers into rosin materials to make the same pliable. However these plasticizers eventually evaporate, oxidize or lose their strength when exposed to the weather leaving a hard rosin base that will crack and powder off of the reticular sheet. The rosin-micro-crystalline-wax composition of this invention, on the other hand, eliminates the disadvantages encountered by mere plasticizing of rosin materials.

It is preferred to use from 20 to 50 parts of the "micro-crystalline paraffin wax" with 80 to 50 parts of natural gum or wood rosin. A mass composed of 25 parts of the "micro-crystalline paraffin wax" with 75 parts of natural gum rosin has been found highly desirable.

The compositions of this invention have low melting points of from 140 to 180° F.

In place of gum rosin or wood rosin, synthetic resin material such as ester gums, alkyd type resins and the like may be used. The coated reticular sheet material can be treated with a glycol or glycerin after cooling of the film thereon to present a non-tacky, or non-adhesive surface to the sheet.

If it is desired to tint or color the film, aniline dyes can be used such as ordinary aniline colors ground in oil. If the aniline color does not mix readily with the molten rosin-wax composition it can be preheated in molten stearic acid and poured slowly from this molten mixture into the rosin-wax composition. The dye will then readily color the composition.

I claim as my invention:

1. A plastic resinous wax composition of matter comprising a homogeneous mixture of from 80 to 50 percent of rosin and from 20 to 50 percent of micro-crystalline paraffin wax, said wax having a melting point of from 140° to 165° F. and being plastic at ordinary temperatures and down to 32° F.

2. A plastic resinous wax composition of matter comprising a homogeneous mixture of from 80 to 50 percent of a resin selected from the group consisting of gum rosin, wood rosin, ester gums, and alkyd type resins and from 20 to 50 percent of micro-crystalline paraffin wax, said wax having a melting point of from 140° to 165° F. and being plastic at temperatures as low as 32° F.

3. A plastic resinous wax composition of matter for closing the meshes of reticular material consisting of a homogeneous mixture of two parts of natural gum rosin and one part of micro-crystalline paraffin wax, said wax having a melting point of from 140° to 165° F. and being plastic at ordinary temperatures down to 32° F.

4. A pliable resinous wax composition of matter for closing the meshes of reticular material comprising 75 percent of a resin material selected from the group consisting of gum rosin, wood rosin, ester gums, and alkyd type resins and 25 percent of micro-crystalline plastic paraffin wax, said wax having a melting point of from 140° to 165° F. and being plastic at ordinary temperatures down to 32° F. and said mixture adapted to form a flexible infra-red and ultra-violet ray penetrable film.

5. A plastic resinous wax composition of matter comprising a pliable, stable, fused mass of from 80 to 50 percent of natural rosin and from 20 to 50 percent of micro-crystalline plastic paraffin wax, said wax having a melting point from 140° to 165° F. and being plastic at ordinary temperatures down to 32° F. and said composition having a melting point between 140–180° F. and adapted to close the meshes of reticular sheet material with a flexible film thereof.

HAROLD WARP.